United States Patent
Doane et al.

(10) Patent No.: US 10,476,154 B2
(45) Date of Patent: Nov. 12, 2019

(54) AUXILIARY ANTENNA ARRAY FOR WIDEBAND SIDELOBE CANCELLATION

(71) Applicant: Massachusetts Institute of Technology, Cambridge, MA (US)

(72) Inventors: Jonathan Peter Doane, Arlington, MA (US); Glenn A. Brigham, Chelmsford, MA (US); Bradley T. Perry, Nashua, NH (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 491 days.

(21) Appl. No.: 15/301,585

(22) PCT Filed: Aug. 5, 2015

(86) PCT No.: PCT/US2015/043881
§ 371 (c)(1),
(2) Date: Oct. 3, 2016

(87) PCT Pub. No.: WO2016/022727
PCT Pub. Date: Feb. 11, 2016

(65) Prior Publication Data
US 2017/0179593 A1 Jun. 22, 2017

Related U.S. Application Data

(60) Provisional application No. 62/033,155, filed on Aug. 5, 2014.

(51) Int. Cl.
*H01Q 3/26* (2006.01)
*G01S 3/06* (2006.01)
(Continued)

(52) U.S. Cl.
CPC ............ *H01Q 3/2635* (2013.01); *G01S 3/06* (2013.01); *G01S 7/2813* (2013.01);
(Continued)

(58) Field of Classification Search
None
See application file for complete search history.

(56) References Cited

U.S. PATENT DOCUMENTS

| | | | |
|---|---|---|---|
| 5,245,347 A | 9/1993 | Bonta et al. | |
| 7,129,888 B1 * | 10/2006 | Chesley | G01S 7/2813 342/159 |

(Continued)

OTHER PUBLICATIONS

PCT Search Report of the ISA for Appl. No. PCT/US2015/043881 dated Dec. 30, 2015; 5 pages.

(Continued)

*Primary Examiner* — Peter M Bythrow
*Assistant Examiner* — Donald H B Braswell
(74) *Attorney, Agent, or Firm* — Daly, Crowley, Mofford & Durkee LLP

(57) ABSTRACT

Described embodiments provide sidelobe cancellation for Simultaneous Transmit and Receive systems. The sidelobe cancellation system includes an array having a primary aperture and an auxiliary array. The auxiliary array includes a plurality of antenna elements disposed adjacent to at least one side of the primary aperture. Each element of the auxiliary array is coupled to a variable attenuator, a variable phase shifter or a variable true time delay unit. A controller tunes the auxiliary array to cancel sidelobes of the primary aperture by adaptively selecting an attenuation value of the variable attenuator, a phase shift value of the variable phase shifter and a time delay value of the variable true time delay unit for each element of the auxiliary array. The auxiliary array operates as an adaptive finite-impulse response (FIR)

(Continued)

filter with each antenna element of the auxiliary array operating as an adaptive tap of the adaptive FIR filter.

29 Claims, 6 Drawing Sheets

(51) Int. Cl.
    *H01Q 21/29*    (2006.01)
    *H01Q 25/02*    (2006.01)
    *G01S 13/02*    (2006.01)
    *G01S 7/28*     (2006.01)
    *G01S 13/34*    (2006.01)
    *G01S 13/76*    (2006.01)

(52) U.S. Cl.
    CPC .......... *G01S 13/346* (2013.01); *G01S 13/762* (2013.01); *H01Q 21/29* (2013.01); *H01Q 25/02* (2013.01); *G01S 2013/0254* (2013.01)

(56) References Cited

U.S. PATENT DOCUMENTS

| | | | | |
|---|---|---|---|---|
| 9,653,799 | B2 * | 5/2017 | Pozgay | H01Q 3/01 |
| 2005/0117660 | A1 * | 6/2005 | Vialle | H04B 1/7115 |
| | | | | 375/299 |
| 2006/0273952 | A1 * | 12/2006 | Krikorian | G01S 7/038 |
| | | | | 342/198 |
| 2007/0013575 | A1 * | 1/2007 | Lee | G01S 7/2813 |
| | | | | 342/52 |
| 2009/0231225 | A1 * | 9/2009 | Choudhury | H01Q 3/26 |
| | | | | 343/770 |
| 2013/0106667 | A1 | 5/2013 | Fenn et al. | |

OTHER PUBLICATIONS

PCT Written Opinion of the ISA for Appl. No. PCT/US2015/043881 dated Dec. 30, 2015; 10 pages.
PCT Transmittal of International Preliminary Report on Patentability for PCT/US2015/043881 dated Feb. 16, 2017; 7 pages.

* cited by examiner

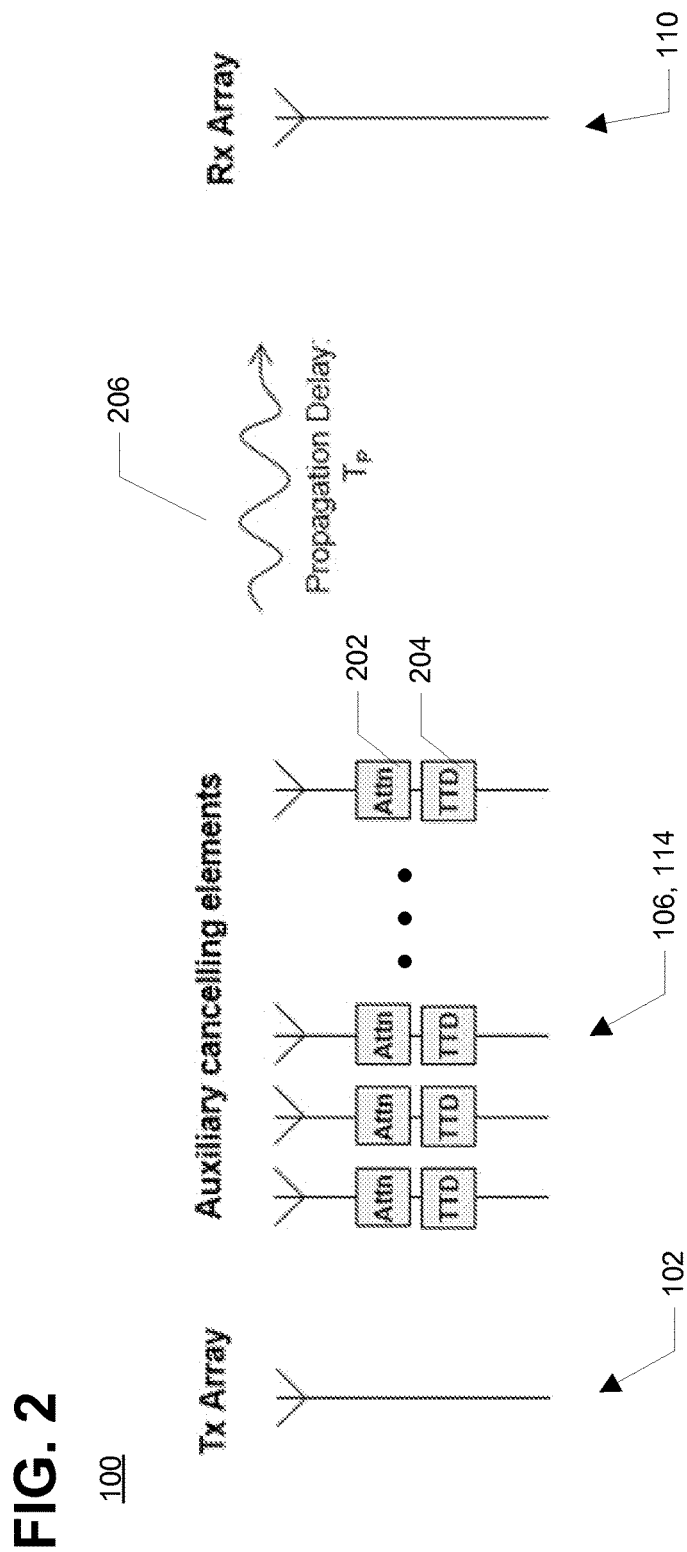

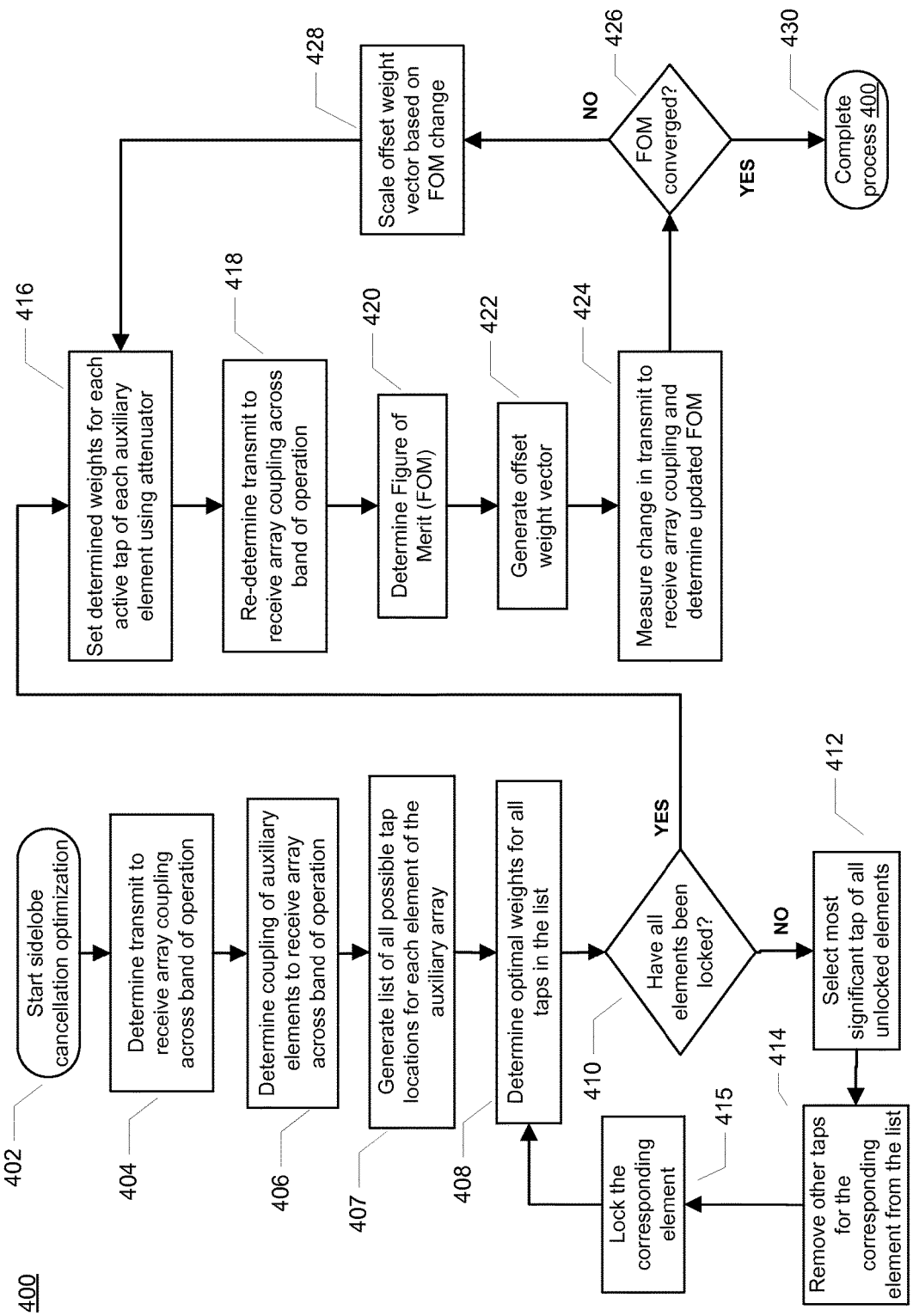

AUXILIARY ANTENNA ARRAY FOR WIDEBAND SIDELOBE CANCELLATION

CROSS REFERENCE TO RELATED APPLICATIONS

This application is a U.S. National Stage of PCT application PCT/US2015/043881 filed in the English language on Aug. 5, 2015, and entitled "AUXILIARY ANTENNA ARRAY FOR WIDEBAND SIDELOBE CANCELLATION," which claims the benefit under 35 U.S.C. § 119 of provisional application No. 62/033,155 filed Aug. 5, 2014, which application is hereby incorporated herein by reference.

STATEMENT REGARDING FEDERALLY SPONSORED RESEARCH

This invention was made with Government support under Contract No. FA8721-05-C-0002 awarded by the U.S. Air Force. The Government has certain rights in the invention.

BACKGROUND

Simultaneous transmit and receive (STAR) refers to the ability of a radio frequency (RF) circuit, device, or system to transmit and receive at the same time, in the same frequency band, with adequate performance in the receiver. Such capability is desired for applications such as, for example, cognitive radio, full-duplex communications systems and relays, spectral management and frequency reuse, multi-function, multi-beam radar and "look through" radar jammers. In a conventional approach, RF transmit and receive operations within a particular frequency band are performed at different times. This is because transmit energy from a transmit antenna will typically leak into the front end of a collocated receiver and overdrive the receiver if transmit and receive operations are performed concurrently. This transmitter leakage can mask the desired receive signals, thus making it difficult or impossible to detect, demodulate, and decode the signals. For STAR operation to be possible, therefore, a certain minimum level of isolation must be maintained between a transmit antenna and a receive antenna.

Various cancellation schemes can be used to improve transmit and receive isolation in a STAR system. For example, some STAR systems inject a filtered version of the transmit signal into the receiver in order to cancel the transmit signal at one or more of the RF signal, the intermediate frequency (IF) or the digital baseband stage of the receiver. Performance of such systems is limited by noise, dynamic range, channel knowledge, and linearity of the receiver and cancelling components. Further, to achieve adequate isolation, multiple layers of cancelling might be required. Another cancellation scheme is spatial cancelling that actively controls the system antenna pattern to increase transmit and receive isolation. Spatial cancellation reduces the transmit signal before it reaches the receive antenna, resulting in higher receiver linearity and dynamic range, and improving the effectiveness of other cancelling techniques. Spatial cancellation allows stronger transmitters and more sensitive receivers to operate simultaneously.

Further, STAR systems might employ high isolation antennas where the transmit and receive antenna elements are in a fixed configuration that has high intrinsic antenna isolation. However, this provides only minimal antenna pattern control and, thus, is not feasible for directive arrays. In other systems, adaptive beamforming might be performed where each element in the transmit and receive antenna arrays has an adaptive filter. This is commonly implemented digitally, with every element having a dedicated digital channel (i.e. digital beamforming), although analog implementations are also possible, for example by using physical tapped delay lines. Although such a system provides robust control of radiated power over space, time and frequency (Space-Time Adaptive Processing or "STAP"), such a system is very expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides sidelobe cancellation for Simultaneous Transmit and Receive (STAR) systems. The sidelobe cancellation system includes an array having a primary aperture and an auxiliary array. The auxiliary array includes a plurality of antenna elements disposed adjacent to at least one side of the primary aperture. Each element of the auxiliary array is coupled to a variable attenuator, a variable phase shifter or a variable true time delay unit. A controller tunes the auxiliary array to cancel sidelobes of the primary aperture by adaptively selecting an attenuation value of the variable attenuator, a phase shift value of the variable phase shifter and a time delay value of the variable true time delay unit for each element of the auxiliary array. The auxiliary array operates as an adaptive finite-impulse response (FIR) filter with each antenna element of the auxiliary array operating as an adaptive tap of the adaptive FIR filter. In an embodiment, the first primary aperture includes $N^2$ antenna elements and the first auxiliary array includes $2N$ antenna elements, where N is a positive integer. The antenna elements of the first primary aperture are a first type of antenna element and the antenna elements of the first auxiliary array are a second type of antenna element having an endfire radiation pattern, for example, a monopole antenna element and an endfire notch antenna element. In an embodiment, the first primary aperture is an N-by-N planar array, and the first auxiliary array is a pair of N-element linear arrays. The N-element linear arrays are disposed adjacent to two different sides of the N-by-N planar array. The antenna elements of the auxiliary array radiate along a ground plane in a direction toward a receiving antenna having a second primary aperture. In an embodiment, the second auxiliary array cancels sidelobes of the second primary aperture. In an embodiment, the first primary aperture is a transmit aperture and the second primary aperture is a receive aperture. Each of the antenna elements of the second auxiliary array is coupled to at least one of a variable attenuator, a variable phase shifter and a variable true time delay unit. A controller tunes the second auxiliary array to cancel sidelobes of the second primary aperture by adaptively selecting an attenuation value of the variable attenuator, a phase shift value of the variable phase shifter and a time delay value of the variable true time delay unit for each antenna element of the second auxiliary array. The second auxiliary array operates as an adaptive finite-impulse response (FIR) filter and each antenna element of the second auxiliary array operates as an adaptive tap of the adaptive FIR filter. The first auxiliary array and the second auxiliary array are configured to increase isolation between the first primary aperture and the second primary aperture. In an embodiment, the first primary aperture and the second primary aperture radiate in a broadside pattern, and the first auxiliary array and the second auxiliary array radiate in an endfire pattern along a ground plane between the first primary aperture and the second primary aperture. In an embodiment, the second primary aperture includes $M^2$ antenna elements, and the second auxiliary array includes 2M antenna elements, where M is a positive integer. In an embodiment, N and M are equal. In an embodiment, the first primary aperture and the second primary aperture employ a common type of antenna element. In an embodiment, the first auxiliary array and the second auxiliary array employ a common type of antenna element. In an embodiment, each antenna element of the second auxiliary array has an endfire radiation pattern, for example, a monopole antenna element or an endfire notch antenna element. In an embodiment, the second primary aperture is an M-by-M planar array and the second auxiliary array is at least one linear array disposed adjacent at least one side of the M-by-M planar array.

Another aspect provides a method of adjusting spatial cancellation of an antenna system for use in a Simultaneous Transmit and Receive (STAR) system having a first army having a first primary aperture and a first auxiliary array and a second array having a second primary aperture. The system determines primary coupling values between the first primary aperture and the second primary aperture across a frequency band of operation of the STAR system. The system determines auxiliary coupling values between each element of the first auxiliary array and the second primary aperture across the frequency band of operation. Based on the determined primary coupling values and auxiliary coupling values, weight coefficients for each active element of the first auxiliary array are determined. The weight coefficients correspond to an attenuation value, a phase shift value, and a time delay value for each active element of the first auxiliary array. The attenuation value, the phase shift value, and the time delay value are set for each active element of the first auxiliary array based on the determined weight coefficients. In an embodiment, the second array includes a second auxiliary array. Primary coupling values between the second primary aperture and the first primary aperture are determined across a frequency band of operation. Auxiliary coupling values between each element of the second auxiliary array and the first primary aperture are determined across the frequency band of operation. Based on the determined primary coupling values and auxiliary coupling values, weight coefficients are determined for each active element of the second auxiliary array, the weight coefficients corresponding to the attenuation value, the phase shift value, and the time delay value for each active element of the second auxiliary array. The attenuation value, the phase shift value, and the time delay value are set for each active element of the second auxiliary array based on the determined weight coefficients. In an embodiment, if the optimal weight coefficients (e.g., the TTD, attenuator, and phase shifter setting for each auxiliary element) cannot be computed efficiently, then a list is made of all possible tap locations (e.g., all TTD settings for all auxiliary elements) and the optimal weights are computed for this list of taps. A most significant element and a most significant tap corresponding to the element are selected from the list and other taps corresponding to the element are removed from the list of taps. The corresponding element is then locked and optimal weight coefficients are determined for the taps remaining in the active tap list for all unlocked elements. This process repeats until all elements have been locked and thus optimal weights and TTD settings have been computed for the auxiliary array. In an embodiment, after setting the attenuation value, the phase shift value, and the time delay value for each active element of the first auxiliary array, and until a figure of merit of the antenna system converges on a target value, the STAR system iteratively re-determines the primary coupling values and the auxiliary coupling values, determines the figure of merit, generates a weight coefficient offset vector and resets the attenuation value, the phase shift value, and the time delay value for each active element of the first auxiliary array based on the generated weight coefficient offset vector, re-determines the figure of merit, and compares the figure of merit to the target value and at least one of the previously determined figures of merit. In an embodiment, the first array is a transmit array and the second array is a receive array, and the first array and second array are collocated proximate to each other.

In another aspect, a Simultaneous Transmit and Receive (STAR) system is provided that includes a transmit array and a receive array. The transmit array includes a first primary aperture and a first auxiliary array disposed adjacent at least one side of the first primary aperture. The first auxiliary array includes at least one of a variable attenuator, a variable phase shifter and a variable true time delay unit. The first auxiliary array is tuned by adaptively selecting at least one of: an attenuation value of the variable attenuator, a phase shift value of the variable phase shifter and a time delay value of the variable true time delay such that the first auxiliary array operates as an adaptive finite-impulse response (FIR) filter to cancel sidelobes of the first primary aperture. The receive array includes a second primary aperture and a second auxiliary array disposed adjacent at least one side of the second primary aperture. The second auxiliary array includes at least one of a variable attenuator, a phase shift value of a variable phase shifter and a time delay value of the variable true time delay unit. The second auxiliary array is tuned by adaptively selecting at least one of: an attenuation value of the variable attenuator, a phase shift value of the variable phase shifter and a time delay value of the variable true time delay such that the second auxiliary array operates as an adaptive finite-impulse response (FIR) filter to cancel sidelobes of the second primary aperture. In an embodiment, the first primary aperture includes a first plurality of antenna, elements and the first auxiliary array include a second plurality of antenna elements disposed adjacent at least one side of the first primary aperture. The first auxiliary array cancels sidelobes of the first primary aperture. Each of the second plurality of antenna elements is coupled to at least one of: the variable attenuator, the variable phase shifter and the variable true time delay unit. In an embodiment, the second primary aperture includes a third plurality of antenna elements and the second auxiliary array includes a fourth plurality of antenna elements disposed adjacent at least one side of the second primary aperture. The second auxiliary array cancels sidelobes of the second primary aperture with each of the second plurality of antenna elements coupled to at least one of: the variable attenuator, the variable phase shifter and the variable true time delay unit. In an embodiment, the antenna elements of the first auxiliary array radiate along a ground plane in a direction toward the second primary aperture so as to cancel sidelobes of the first primary aperture directed toward the second primary aperture. The antenna elements of the second auxiliary array radiate along a ground plane in a direction toward the first primary aperture so as to cancel sidelobes of the second primary aperture directed toward the first primary aperture. In an embodiment, the antenna elements of the first auxiliary array are disposed adjacent to at least one side of the first primary aperture located most proximate to the second primary aperture. In an embodiment, the antenna elements of the second auxiliary array are disposed adjacent to at least one side of the second primary aperture located most proximate to the first primary aperture.

BRIEF DESCRIPTION OF THE DRAWING FIGURES

Other aspects, features, and advantages of the claimed invention will become more fully apparent from the following, detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a block diagram of the collocated array transmit and receive arrays as used in a STAR system;

FIG. 4 is a flow diagram showing an illustrative cancellation process of the collocated arrays shown in FIGS. 1 and 2.

DETAILED DESCRIPTION

Table 1 summarizes a list of acronyms employed throughout this specification as an aid to understanding the described embodiments of the invention:

TABLE 1

| FIR | Finite Impulse Response | FOM | Figure Of Merit |
|---|---|---|---|
| IF | Intermediate Frequency | RF | Radio Frequency |
| RX | Receive | SLL | SideLobe Level |
| STAP | Space-Time Adaptive Processing | STAR | Simultaneous Transmit And Receive |
| TTD | True Time Delay | TX | Transmit |

Described embodiments provide sidelobe cancellation for Simultaneous Transmit and Receive (STAR) systems. The sidelobe cancellation system includes an array having a primary aperture and an auxiliary array. The auxiliary array includes a plurality of antenna elements disposed adjacent to at least one side of the primary aperture. Each element of the auxiliary array is coupled to a variable attenuator, a variable phase shifter or a variable true time delay unit. A controller tunes the auxiliary array to cancel sidelobes of the primary aperture by adaptively selecting an attenuation value of the variable attenuator, a phase shift value of the variable phase shifter and a time delay value of the variable true time delay unit for each element of the auxiliary array. The auxiliary array operates as an adaptive finite-impulse response (FIR) filter with each antenna element of the auxiliary array operating as an adaptive tap of the adaptive FIR filter.

Figure 1:
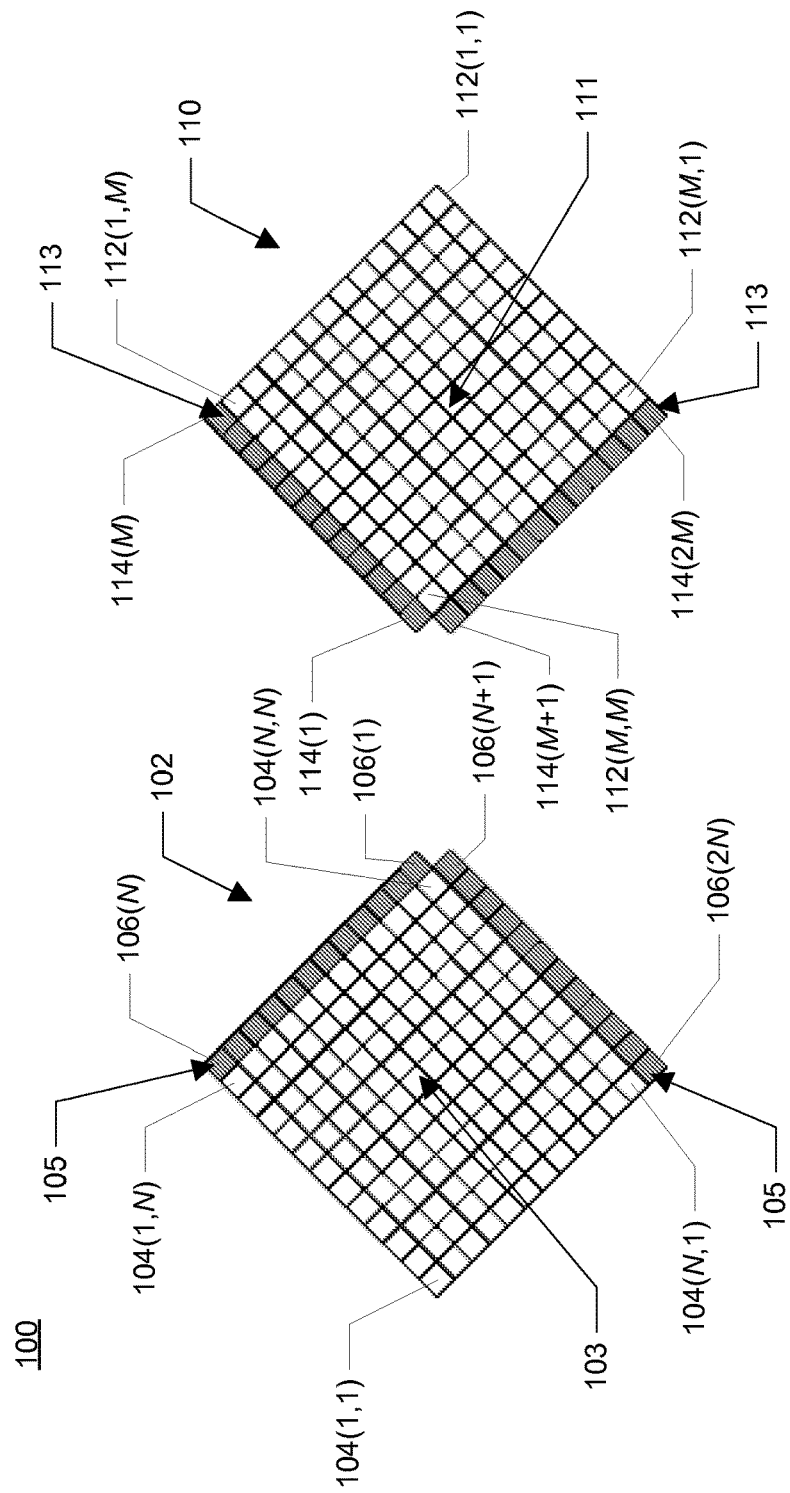
FIG. 1 is a top view of collocated transmit and receive array antennas for use in a Simultaneous Transmit And Receive (STAR) system and having sidelobe cancellation.

FIG. 1 shows a top view of collocated transmit and receive array antennas of STAR system 100. As shown in FIG. 1, STAR system 100 includes transmit array 102 and receive array 110. Transmit array 102 includes primary aperture 103 and auxiliary array 105. Receive array 110 includes primary aperture 111 and auxiliary array 113. Although shown in FIG. 1 as having an auxiliary array for both transmit array 102 and receive array 110 (e.g., auxiliary array 105 and auxiliary array 113, respectively), an auxiliary array need not be implemented at both transmit array 102 and receive array 110, and rather could be implemented only at one of the transmit or receive arrays. Further, as shown in FIG. 1, transmit array 102 and receive array 110 might be rotated by 45 degrees in relation to each other (e.g., corners of the planar arrays facing each other) to reduce sidelobe coupling between transmit array 102 and receive array 110.

As shown, in some embodiments, primary aperture 103 might be implemented as an array of antenna elements, although other implementations are possible, for example a single horn antenna or a lens. In the illustrative embodiment shown in FIG. 1, primary aperture 103 is an N-by-N array of antenna elements 104, shown as antenna elements 104 (1,1) through 104(N,N), thus including $N^2$ antenna elements 104. Similarly, in some embodiments, primary aperture 111 might be implemented as an array of antenna elements, although other implementations are possible, for example a single horn antenna or a lens. In the illustrative embodiment shown in FIG. 1, primary aperture 111 is an M-by-M array of antenna elements 112, shown as antenna elements 112(1, 1) through 112(M,M) thus including $M^2$ antenna elements 112. Further, in the embodiment shown in FIG. 1, auxiliary array 105 includes 2N antenna elements, shown as elements 106(1) through 106(2N), and auxiliary array 113 includes 2M elements, shown as elements 114(1) through 114(2M). N and M are positive integers and, in some embodiments, N and M are equal. In some embodiments, elements 106(1) through 106(N) and elements 106(N+1) through 106(2N) are fed out of phase from each other. Similarly, elements 114(1) through 114(M) and elements 114(M+1) through 114(2M) might be fed out of phase from each other.

Primary aperture 103 of transmit array 102 and primary aperture 111 of receive array 110 each radiate in a broadside pattern (e.g., out of the page, orthogonal to the top view of aperture 103 shown in FIG. 1). In some embodiments, primary aperture 103 of transmit array 102 and primary aperture 111 of receive array 110 might be dual polarized.

In the embodiment shown in FIG. 1, auxiliary arrays 105 and 113 might be implemented as one or more linear arrays of antenna elements, although other implementations are possible. In particular, each of auxiliary arrays 105 and 113 might be implemented as one or more linear arrays disposed along one or more edges of the corresponding primary aperture (e.g., auxiliary array 105 might be disposed along one or more edges of primary aperture 103 and auxiliary array 113 might be disposed along one or more edges of primary aperture 111). In particular embodiments, auxiliary array 105 is disposed along the one or more edges of primary aperture 103 closest (e.g., most proximate) to receive array 110, and auxiliary array 113 is disposed along the one or more edges of primary aperture 111 closest (e.g., most proximate) to transmit array 102. As shown in FIG. 1, when transmit array 102 and receive array 110 are rotated by 45 degrees in relation to each other, auxiliary array 105 is disposed along the two edges of primary aperture 103 closest to receive array 110 and auxiliary array 113 is disposed along the two edges of primary aperture 111 closest to transmit array 102.

In some embodiments, the antenna elements of auxiliary array 105 have endfire radiation patterns such that the radiation from auxiliary array 105 propagates along a ground plane (not shown) toward receive array 110. Similarly, the antenna elements of auxiliary array 113 have endure radiation patterns such that the radiation from auxiliary array 113 propagates along the ground plane (not shown) toward transmit array 102. For example, the antenna elements of auxiliary arrays 105 and 113 might be implemented as monopole antenna elements or endfire notch antenna elements since both monopoles and endfire notch antennas exhibit vertical polarization that propagate over the ground plane, thus having radiation patterns that direct power toward the opposing one of arrays 102 and 110, instead of in a main beam of arrays 102 and 110.

In some embodiments, N and M are equal, although any combination of values for N and M might be employed. In embodiments where N and M are equal to 12 (e.g., primary aperture 103 is a 144 element planar array and auxiliary array 105 includes 24 elements and primary aperture 111 is also a 144 element planar array and auxiliary array 113 also includes 24 elements), employing only one of auxiliary array 105 or auxiliary array 113 improves isolation between transmit array 102 and receive array 110 by approximately 30 dB. Employing both auxiliary arrays 105 and 113 improves isolation between transmit array 102 and receive array 110 by approximately 60 dB. In exemplary systems, the isolation improvement is implemented over multiple sub-bands in a frequency range of operation spanning 6-18 GHz. For example, some embodiments implement the isolation improvement in three 200 MHz sub-bands spanning 6-18 GHz.

FIG. 2 shows a block diagram of the collocated array transmit and receive arrays as used in STAR system 100. As shown in FIG. 2, one or more auxiliary cancelling elements 106 and 114 are located between the primary aperture of transmit array 102 and the primary aperture of receive array 110. RF signals transmitted by transmit array 102 and auxiliary cancelling elements 106 are transmitted to receive array 110, shown as RF signal 206, which experiences a propagation delay, $T_P$, as it propagates between transmit array 102 and receive array 110.

Each auxiliary cancelling elements 106 and 114 have an adjustable amplitude and time delay. As shown in FIG. 2, each of auxiliary cancelling elements 106 and 114 has a corresponding attenuator, shown as attenuator 202, and a corresponding true time delay unit, shown as TTD 204. In some embodiments, each of auxiliary cancelling elements 106 and 114 might also, or alternatively, have a phase shifter (not shown). Each of attenuators 202 and TTDs 204 are used to tune the operation of each of the corresponding auxiliary cancelling elements 106 and 114 to cancel the greatest amount and amplitude of sidelobes coupled between transmit array 102 and receive array 110. Thus, some embodiments avoid the need for additional filtering per each element by employing each auxiliary element 106 and 114 as an adaptive tap of a finite impulse response (FIR) filter of the STAR system. The combined radiation pattern of primary aperture 103 and auxiliary cancelling elements 106 produces a wideband null to reduce or eliminate power in sidelobes of primary aperture 103 of transmit array 102 that is coupled to primary aperture 111 of receive array 110. In STAR applications, reducing the power in the sidelobes of the transmit array 102 beneficially increases the isolation between transmitter and receiver.

Thus, each element of the auxiliary arrays 105 and 113 act as an adaptive FIR filter tap having a tap delay equal to the propagation delay ($T_P$) plus the element time delay implemented by the TTD unit 204 corresponding to the respective element. Further, variable attenuators 202 determine tap weight (e.g., cancellation magnitude) for each respective element. In some embodiments, the polarity of the tap weight is fixed (positive or zero weights only), but some embodiments might employ a 180 degree hybrid phase shifter (not shown) to achieve negative weights (e.g., by shifting the signal 180 degrees out of phase). The resulting FIR filter is tuned to cancel sidelobe coupling between transmit array 102 and receive array 110 (e.g., to increase transmit-receive isolation). The performance (e.g., isolation improvement) of STAR system 100 depends on several factors including the number of auxiliary arrays (e.g., whether used on a single one of transmit array 102 and receive array 110 or on both arrays), the number of elements of each auxiliary array, the desired bandwidth of operation of STAR system 100 and the channel complexity.

Figure 3A:
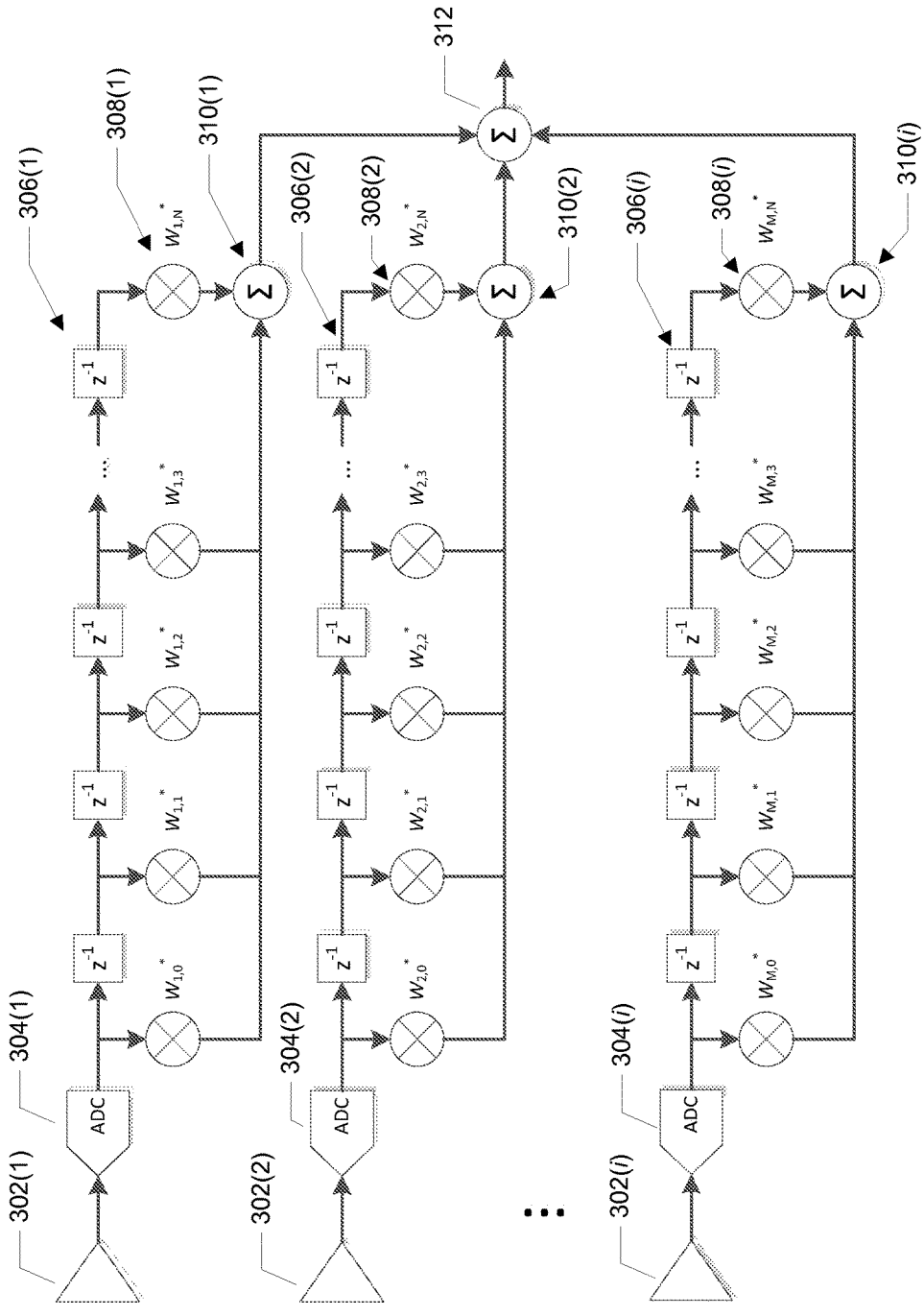
FIGS. 3A and 3B are block diagrams showing a wideband digital beamformer of the collocated arrays shown in FIG. 1.
Figure 3B:
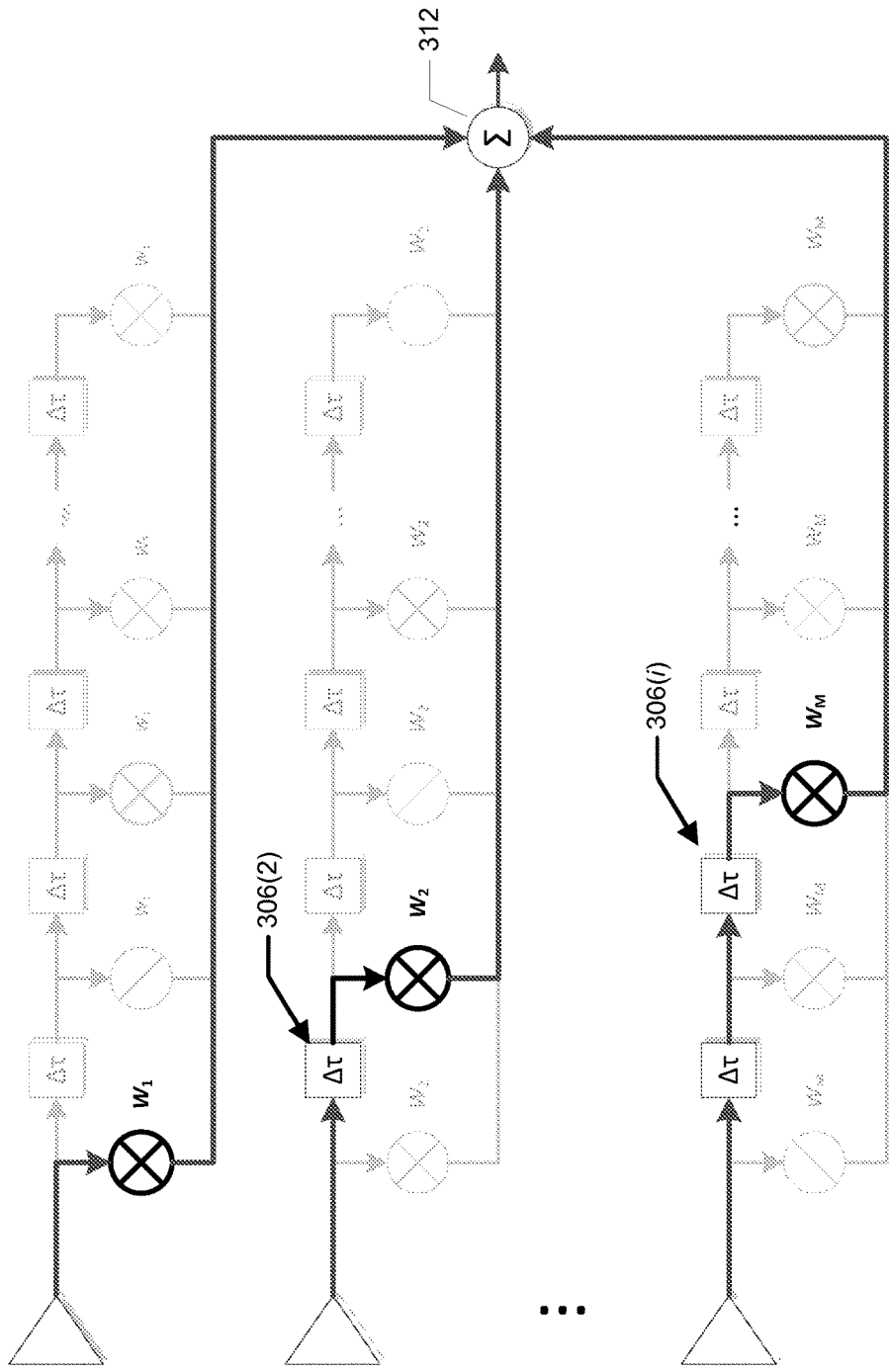

FIGS. 3A and 3B are block diagrams showing each element of an auxiliary array as an adaptive tap of an adaptive FIR filter of system 100. As shown in FIG. 3A, each element 302(1) through 302(i) is a fully digital channel after analog-to-digital conversion by ADCs 304(1) through 304(i). In described embodiments, i is equal to N for auxiliary array 105 and i is equal to M for auxiliary array 113. Each element of the auxiliary array acts as a tap in a multi-tap FIR filter. The sidelobe cancellation capability of the FIR filter is limited by the linearity of the components in the signal path of each element. Described embodiments provide element-level control of the tap weights by providing element-level control of the amplitude and true time delay (TTD) by control of each of delay elements 306 and attenuators 308.

As shown in FIG. 3A, in an ideal system, each element might be implemented having multiple taps where the total value of the taps for each element is combined by summers 310 into a single signal for each element. The total output of all the elements of the auxiliary array is combined by summer 312 and provided for additional processing by system 100. However, the system shown in FIG. 3A is a highly complex system since each element could have multiple taps, and is thus not ideally suited for implementation in a STAR system. Thus, as shown in FIG. 3B, the FIR filter might instead be implemented as a single tap sparse FIR filter, where each element of the auxiliary array is tuned to have a specific tap value, and the other taps are disabled or otherwise not implemented. As shown in FIG. 3B, for example, element 302(2) has a corresponding tap having a delay set by TTD 306(2) and an amplitude set by attenuator 308(2), white other TTD elements and attenuators are not enabled (e.g., are shaded out). Thus, FIG. 3B shows a logical diagram of the implementation of the auxiliary arrays (taps) and variable amplitude and TTD (tap weights) as a sparse FIR filter.

FIG. 4 is a flow diagram showing sidelobe cancellation tuning process 400. As shown in FIG. 4, sidelobe cancellation tuning process 400 starts at block 402. At block 404, STAR system 100 determines the coupling between primary aperture 103 of transmit array 102 and primary aperture 111 of receive array 110 across one or more desired frequency bands of operation for system 100. At block 406, STAR system 100 determines the coupling between each element of auxiliary array 105 of transmit array 102 and primary aperture 111 of receive array 110 across one or more desired frequency bands of operation for system 100. At block 407, system 100 generates a list of all possible tap locations (e.g., as a dense FIR filter) for each element of the auxiliary array. At block 408, system 100 determines optimal weights for all the tap locations in the list. At block 410, if tap locations and weights for all the elements of the auxiliary array have been determined and locked, then process 400 proceeds to block 416.

If, at block 410, tap locations and weights for all the elements of the auxiliary array have not been determined and locked, then process 400 proceeds to block 412. At block 412, system 100 selects the most significant tap location of all the unlocked elements of the auxiliary array. The most significant tap location of all the unlocked elements corresponds to a specific one of the elements of the auxiliary array and a specific combination of settings for the attenuator and TTD (e.g., the tap weight). System 100 removes tap locations from the list that correspond to the selected element, other than the most significant tap location for the element. At block 415, the corresponding selected element is locked in the list. Process 400 returns to block 408. Blocks 408, 410, 412, 414, and 415 are repeated until all the elements are locked (e.g., a most significant tap location is selected for each element of the auxiliary array).

At block 410, once tap locations and weights for all the elements of the auxiliary array have been determined and locked, then at block 416 system 100 sets the determined weights (e.g., attenuation and TTD) for each element of the auxiliary array. At block 418, system 100 re-determines the coupling between primary aperture 103 of transmit array 102 and primary aperture 111 of receive array 110 across one or more desired frequency bands of operation for system 100. At step 420, system 100 determines at least one figure of merit (FOM) to gauge performance of system 100. In described embodiments, the FOM is the transmit-receive isolation between transmit array 102 and receive array 110. At step 422, system 100 generates a weight offset vector by which the determined weights are adjusted to attempt to fine-tune the weights and, thus, sidelobe cancellation performance of system 100. At block 424, system 100 measures the change in the FOM (e.g., the change in the transmit-receive isolation between transmit array 102 and receive array 110) between the original weights and the weights as updated by the weight offset vector. At block 426, if the FOM (e.g., the change in the transmit-receive isolation between transmit array 102 and receive array 110) has reached an optimal target value ("converged"), then at block 430, process 400 completes. If, at block 426, if the FOM (e.g., the change in the transmit-receive isolation between transmit array 102 and receive array 110) has not yet reached an optimal target value ("converged"), then at block 428 the offset weight vector is adjusted and process 400 returns to block 416 to adjust the weights until an optimal FOM target value is reached.

As shown in FIG. 4, process 400 is performed for one of auxiliary arrays 105 and 113. In systems employing both auxiliary arrays 105 and 113, process 400 is repeated for each auxiliary array to tune the overall system.

Thus, process 400 is a heuristic algorithm that assumes having the same number of elements in the auxiliary array as there are TTD delay slots, such as would be available for a complex dense FIR filter. Process 400 measures channel response and solves for least squares filter (e.g., a closed-form matrix inversion) and selects only the largest weights. The auxiliary element having the largest weight is set (e.g., the attenuation and TTD) to the largest corresponding tap position, and the remaining taps for that element are zeroed (e.g., as shaded out in FIG. 3B). Process 400 applies a gradient descent algorithm to optimize weights for this configuration (e.g., as a convex problem that converges quickly). A cost function might include total auxiliary element power, to maintain efficiency and minimize beam distortion of the primary aperture. Thus, process 400 provides a fast optimization since there are no measurements in the loop and yields an approximate solution that is good starting point for gradient descent. Such a hardware-in-the-loop technique yields highly accurate optimizations.

Figure 5:
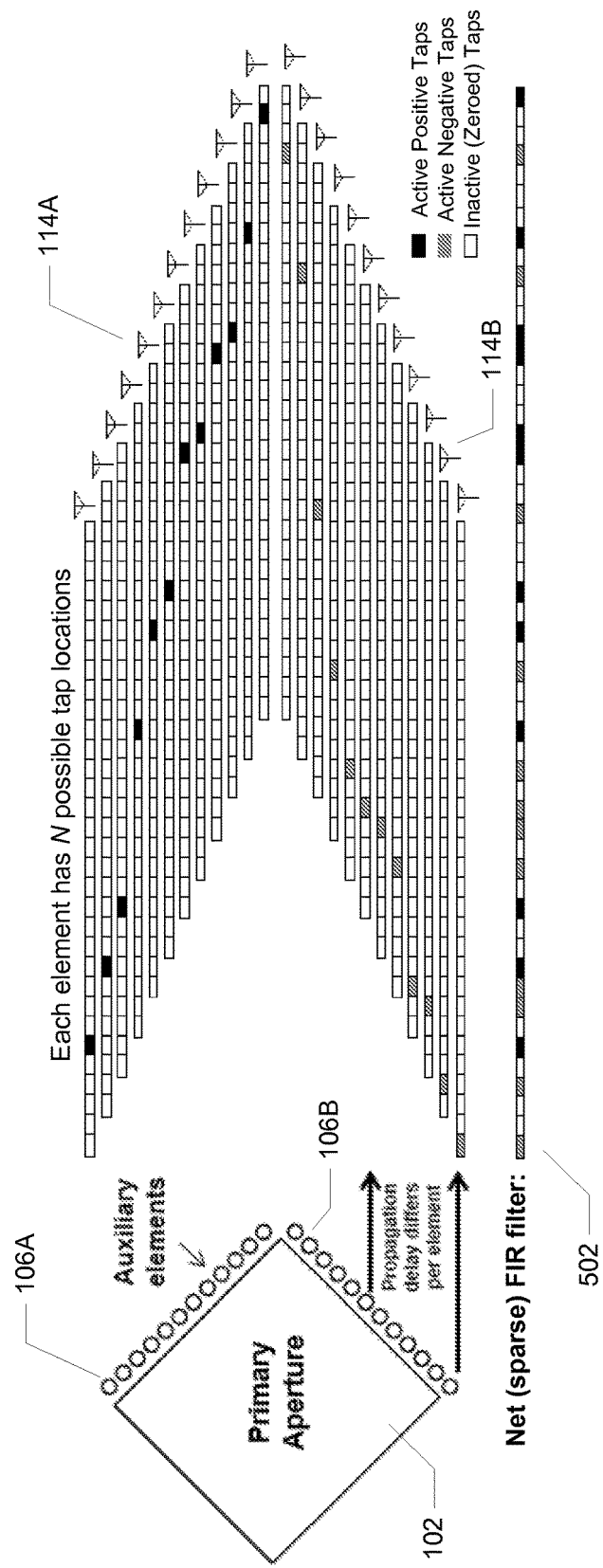
FIG. 5 is a block diagram representing the collocated arrays shown in FIG. 1.

FIG. 5 is a block diagram representing STAR system 100 shown in FIG. 1. FIG. 5 shows a representation of the auxiliary arrays as a sparse FIR filter for system 100. In particular, FIG. 5 shows a 24-element auxiliary array (e.g., one of auxiliary arrays 105 or 113), where 12 of the elements (e.g., elements 106(1) through 106(N)) are utilized as positive taps, and 12 of the elements (e.g., elements 106(N+1) through 106(2N)) are utilized as negative taps, for example by using a phase shifter to feed elements 106(1) through 106(N)) and elements 106(N+1) through 106(2N) 180 degrees out of phase. As described above, process 400 is employed to determine where to place taps in terms of time delay (e.g., to determine best settings for TTDs 204). Thus, as shown, the auxiliary arrays act as a sparse FIR filter where each element of the auxiliary array has one corresponding tap, where the TTD setting determines the tap delay and the attenuator setting determines the tap weight. These settings are selected to optimize cancellation of the sidelobes of the primary aperture.

Described embodiments provide approximately 30 dB improvement of multiband spatial cancellation in transmit-receive isolation versus intrinsic transmit-receive isolation using only one-way cancelling (e.g., only one of auxiliary arrays 105 and 113). Employing both auxiliary arrays doubles the transmit-receive isolation improvement.

Thus, described embodiments provide a low cost solution (versus digital beamforming) to increase transmit-to-receive isolation in STAR systems. Such embodiments are ideal for integration into wideband analog beamforming arrays, which might already include amplitude or TTD control for one or more elements of the arrays, which allows improved performance with minimal increase in array complexity. Further, the auxiliary cancelling elements may replace terminated edge elements that are already present in many array designs. Described embodiments provide wideband isolation improvement (versus magnitude and phase pattern synthesis), and the operational bandwidth is theoretically DC to the Nyquist rate of TTD resolution while requiring low power consumption to provide the sidelobe cancellation since the elements of the auxiliary arrays have appropriate polarization and radiation patterns to maximize cancellation while reduced beam distortion and sidelobe level (SLL). In some embodiments, the SILL is less than 20 dB unaffected and the total auxiliary element power is −20 dB relative to the total transmit power. Further, described embodiments tune the cancellation performance of the auxiliary arrays by a simple algorithm that provides efficient optimization of bandwidth and performance.

Described embodiments provide sidelobe cancellation for Simultaneous Transmit and Receive (STAR) systems. The sidelobe cancellation system includes an array having a primary aperture and an auxiliary array. The auxiliary array includes a plurality of antenna elements disposed adjacent to at least one side of the (primary aperture. Each element of the auxiliary array is coupled to a variable attenuator, a variable phase shifter or a variable true time delay unit. A controller tunes the auxiliary array to cancel sidelobes of the primary aperture by adaptively selecting an attenuation value of the variable attenuator, a phase shift value of the variable phase shifter and a time delay value of the variable true time delay unit for each element of the auxiliary array. The auxiliary array operates as an adaptive finite-impulse response (FIR) filter with each antenna element of the auxiliary array operating as an adaptive tap of the adaptive FIR filter.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employ's A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

We claim:

1. A sidelobe cancellation system comprising:
a first array comprising (i) a first primary aperture, and (ii) a first auxiliary array comprising a plurality of antenna elements disposed adjacent to the first primary aperture, the first auxiliary array configured to cancel at least one sidelobe of the first primary aperture with each of the plurality of antenna elements coupled to at least one of: a variable attenuator, a variable phase shifter and a variable true time delay unit; and
a first controller configured to tune the first auxiliary array to cancel at least one sidelobe of the first primary aperture by adaptively selecting at least one of an attenuation value of the variable attenuator, a phase shift value of the variable phase shifter and a time delay value of the variable true time delay unit for each antenna element of the first auxiliary array, wherein the first auxiliary array is configured to operate as an adaptive finite-impulse response (FIR) filter with each of the plurality of antenna elements configured to operate as an adaptive tap of the adaptive FIR filter;

wherein the antenna elements of the first auxiliary array are configured to radiate along a ground plane in a direction toward a receiving antenna, the receiving antenna comprising a second primary aperture, and wherein the first primary aperture and the first auxiliary array and the second primary aperture are coplanar.

2. The sidelobe cancellation system of claim 1, wherein the first primary aperture comprises $N^2$ antenna elements, and the first auxiliary array comprises 2N antenna elements, where N is a positive integer.

3. The sidelobe cancellation system of claim 2, wherein the antenna elements of the first primary aperture are provided as a first type of antenna element and the antenna elements of the first auxiliary array are provided as a second type of antenna element, the second type of antenna element having an endfire radiation pattern.

4. The sidelobe cancellation system of claim 3, wherein each antenna element of the first auxiliary array comprises one of a monopole antenna element and an endfire notch antenna element.

5. The sidelobe cancellation system of claim 2, wherein:
the first primary aperture is provided as an N-by-N planar array; and
the first auxiliary array comprises a pair of N-element linear arrays with a first one of the pair of N-element linear arrays disposed adjacent a first side of the N-by-N planar array and a second one of the pair of N-element linear arrays disposed adjacent a second, different side of the N-by-N planar array.

6. The sidelobe cancellation system of claim 2, wherein the first primary aperture comprises an N-by-N planar array, and the first auxiliary array comprises a 2N element linear array with at least a portion of the 2N element linear array disposed adjacent a first side of the N-by-N planar array.

7. The sidelobe cancellation system of claim 1, wherein the receiving antenna comprises a second auxiliary array comprising a plurality of antenna elements, the second auxiliary array configured to cancel at least one sidelobe of the second primary aperture.

8. The sidelobe cancellation system of claim 7, wherein the first primary aperture is configured as a transmit aperture and the second primary aperture is configured as a receive aperture.

9. The sidelobe cancellation system of claim 7, wherein:
each of the plurality of antenna elements of the second auxiliary array is coupled to at least one of a variable attenuator, a variable phase shifter and a variable true time delay unit; and
a controller is coupled to the second auxiliary array, the controller configured to tune the second auxiliary array to cancel at least one sidelobe of the second primary aperture by adaptively selecting at least one of an attenuation value of the variable attenuator, a phase shift value of the variable phase shifter and a time delay value of the variable true time delay unit for each antenna element of the second auxiliary array, wherein the second auxiliary array is configured to operate as an adaptive finite-impulse response (FIR) filter and each antenna element of the second auxiliary array is configured to operate as an adaptive tap of the adaptive FIR filter.

10. The sidelobe cancellation system of claim 9, wherein the first auxiliary array and the second auxiliary array are configured to increase isolation between the first primary aperture and the second primary aperture.

11. The sidelobe cancellation system of claim 9, wherein the first primary aperture and the second primary aperture are configured to radiate in a broadside pattern, and wherein the antenna elements of the first auxiliary array and the antenna elements of the second auxiliary array are configured to radiate in an endfire pattern along a ground plane between the first primary aperture and the second primary aperture.

12. The sidelobe cancellation system of claim 1, wherein the controller is configured to tune the first auxiliary array by:
determining primary coupling values between the first primary aperture and the second primary aperture across a frequency band of operation of the antenna system;
determining auxiliary coupling values between each element of the first auxiliary array and the second primary aperture across the frequency band of operation of the antenna system;
determining, based on the determined primary coupling values and auxiliary coupling values, weight coefficients for each active element of the first auxiliary array, the weight coefficients corresponding to the attenuation value, the phase shift value, and the time delay value for each active element of the first auxiliary array; and
setting the attenuation value, the phase shift value, and the time delay value for each active element of the first auxiliary array based on the determined weight coefficients.

13. The sidelobe cancellation system of claim 9, wherein the controller is configured to tune the second auxiliary array by:
determining primary coupling values between the second primary aperture and the first primary aperture across a frequency band of operation of the antenna system;
determining auxiliary coupling values between each element of the second auxiliary array and the first primary aperture across the frequency band of operation of the antenna system;
determining, based on the determined primary coupling values and auxiliary coupling values, weight coefficients for each active element of the second auxiliary array, the weight coefficients corresponding to the attenuation value, the phase shift value, and the time delay value for each active element of the second auxiliary array; and
setting the attenuation value, the phase shift value, and the time delay value for each active element of the second auxiliary array based on the determined weight coefficients.

14. The sidelobe cancellation system of claim 12, wherein, if the determined weight coefficients cannot be achieved by setting the attenuation value, the phase shift value, and the time delay value for each active element of the first auxiliary array, the controller is further configured to:
determine the optimal weights from a tap list of all possible taps formed by every time delay value of each element in the auxiliary array;
select a most significant element and a most significant tap corresponding to the element;
remove other taps corresponding to the element from the tap list;

lock the corresponding element; and
determine optimal weight coefficients for all remaining taps in the tap list for all unlocked elements.

15. The sidelobe cancellation system of claim 12, wherein the controller is further configured to:
iteratively, after setting the attenuation value, the phase shift value, and the time delay value for each active element of the first auxiliary array, and until at least one figure of merit of the antenna system converges on at least one corresponding target value:
re-determine the primary coupling values and the auxiliary coupling values; determine the at least one figure of merit of the antenna system;
generate a weight coefficient offset vector and reset the attenuation value, the phase shift value, and the time delay value for each active element of the first auxiliary array and the second auxiliary array based on the generated weight coefficient offset vector;
re-determine the at least one figure of merit; and
compare the at least one figure of merit to the at least one corresponding target value and at least one of the previously determined figures of merit.

16. The sidelobe cancellation system of claim 9, wherein the second primary aperture comprises $M^2$ antenna elements, and the second auxiliary array comprises 2M antenna elements, where M is a positive integer.

17. The sidelobe cancellation system of claim 16, wherein N and M are equal.

18. The sidelobe cancellation system of claim 16, wherein the antenna elements of the second primary aperture are provided as a third type of antenna element and the antenna elements of the second auxiliary array are provided as a fourth type of antenna element.

19. The sidelobe cancellation system of claim 18, wherein the first type of antenna element and the third type of antenna element are the same type of antenna element, and wherein the second type of antenna element and the fourth type of antenna elements are the same type of antenna element.

20. The sidelobe cancellation system of claim 18, wherein each antenna element of the second auxiliary array has an endfire radiation pattern.

21. The sidelobe cancellation system of claim 20, wherein each antenna element of the second auxiliary array comprises one of: a monopole antenna element and an endfire notch antenna element.

22. The sidelobe cancellation system of claim 16, wherein:
the second primary aperture is provided as an M-by-M planar array; and
the second auxiliary array comprises a pair of M-element linear arrays with a first one of the pair of M-element linear arrays disposed adjacent a first side of the M-by-M planar array and a second one of the pair of M-element linear arrays disposed adjacent a second, different side of the M-by-M planar array.

23. The sidelobe cancellation system of claim 16, wherein:
the second primary aperture comprises an M-by-M planar array, and the second auxiliary array comprises a 2M element linear array with at least a portion of the 2M element linear array disposed adjacent a first side of the M-by-M planar array.

24. A system comprising:
a transmit array comprising:
a first primary aperture; and
a first auxiliary array disposed adjacent at least one side of the first primary aperture, the first auxiliary array comprising at least one of a variable attenuator, a variable phase shifter and a variable true time delay unit; and
a first controller configured to tune the first auxiliary array by adaptively selecting at least one of: an attenuation value of the variable attenuator, a phase shift value of the variable phase shifter and a time delay value of the variable true time delay such that the first auxiliary array is configured to operate as an adaptive finite-impulse response (FIR) filter to cancel at least one sidelobe of the first primary aperture; and
a receive array comprising:
a second primary aperture; and
a second auxiliary array disposed adjacent at least one side of the second primary aperture, the second auxiliary array comprising at least one of a variable attenuator, a variable phase shifter and a variable true time delay unit; and
a second controller configured to tune the second auxiliary array by adaptively selecting at least one of: an attenuation value of the variable attenuator, a phase shift value of the variable phase shifter and a time delay value of the variable true time delay such that the second auxiliary array is configured to operate as an adaptive finite-impulse response (FIR) filter to cancel at least one sidelobe of the second primary aperture;
wherein the first primary aperture and the first auxiliary array and the second primary aperture are coplanar.

25. The system of claim 24 wherein:
the first primary aperture comprises a first plurality of antenna elements; and
the first auxiliary array comprises a second plurality of antenna elements disposed adjacent at least one side of the first primary aperture, the first auxiliary array configured to cancel at least one sidelobe of the first primary aperture, with each of the second plurality of antenna elements coupled to at least one of: the variable attenuator, the variable phase shifter and the variable true time delay unit.

26. The system of claim 25 wherein:
the second primary aperture comprises a third plurality of antenna elements; and
the second auxiliary array comprises a fourth plurality of antenna elements disposed adjacent at least one side of the second primary aperture, the second auxiliary array configured to cancel at least one sidelobe of the second primary aperture with each of the second plurality of antenna elements coupled to at least one of: the variable attenuator, the variable phase shifter and the variable true time delay unit.

27. The system of claim 25 wherein:
the antenna elements of the first auxiliary array are configured to radiate along a ground plane in a direction toward the second primary aperture so as to cancel sidelobes of the first primary aperture directed toward the second primary aperture; and
the antenna elements of the second auxiliary array are configured to radiate along a ground plane in a direction toward the first primary aperture so as to cancel sidelobes of the second primary aperture directed toward the first primary aperture.

28. The system of claim 27, wherein the antenna elements of the first auxiliary array are disposed adjacent to at least one side of the first primary aperture, the at least one side of the first primary aperture located most proximate to the second primary aperture.

29. The system of claim 27, wherein the antenna elements of the second auxiliary array are disposed adjacent to at least one side of the second primary aperture, the at least one side of the second primary aperture located most proximate to the first primary aperture.

* * * * *